Patented Feb. 23, 1937

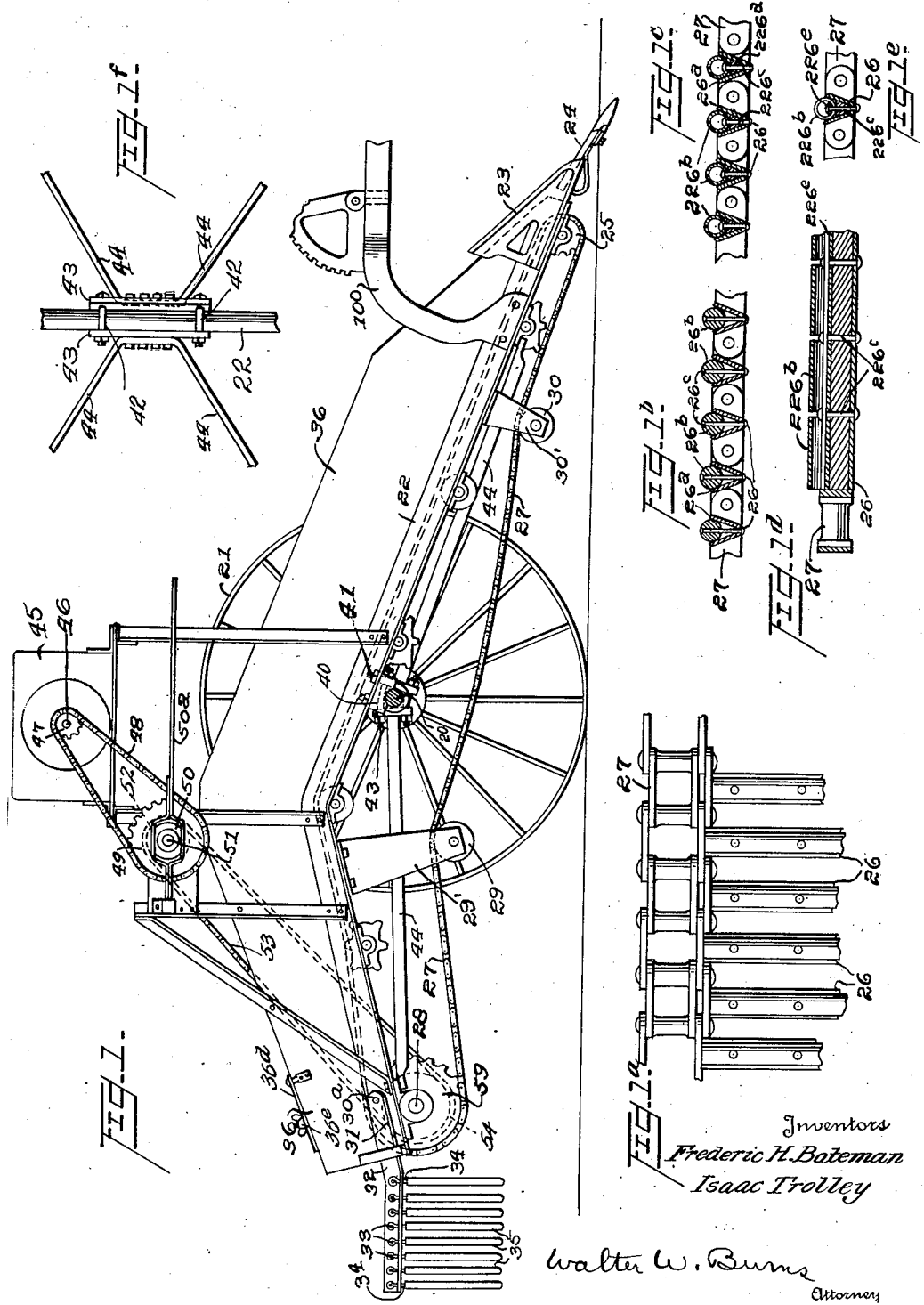

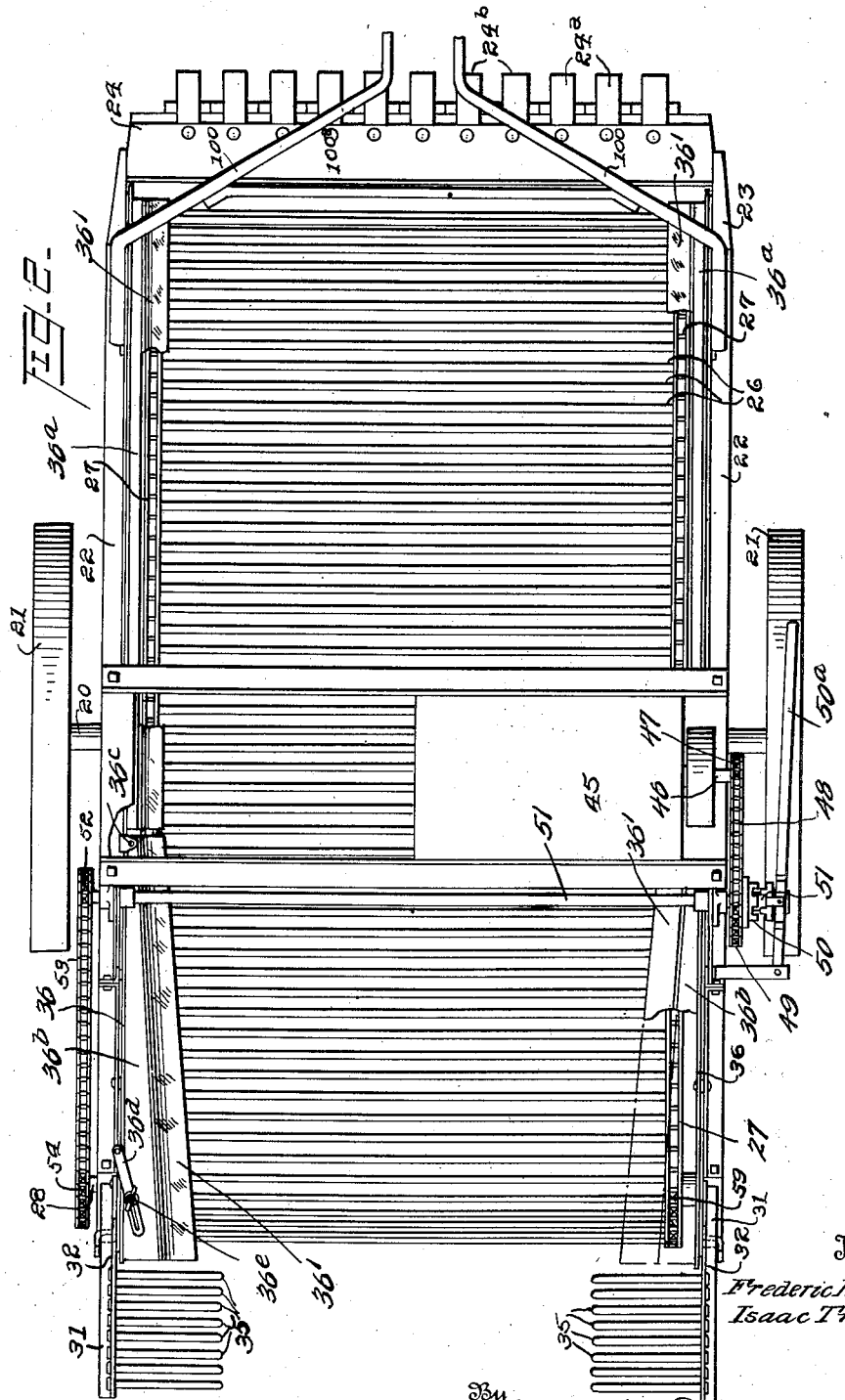

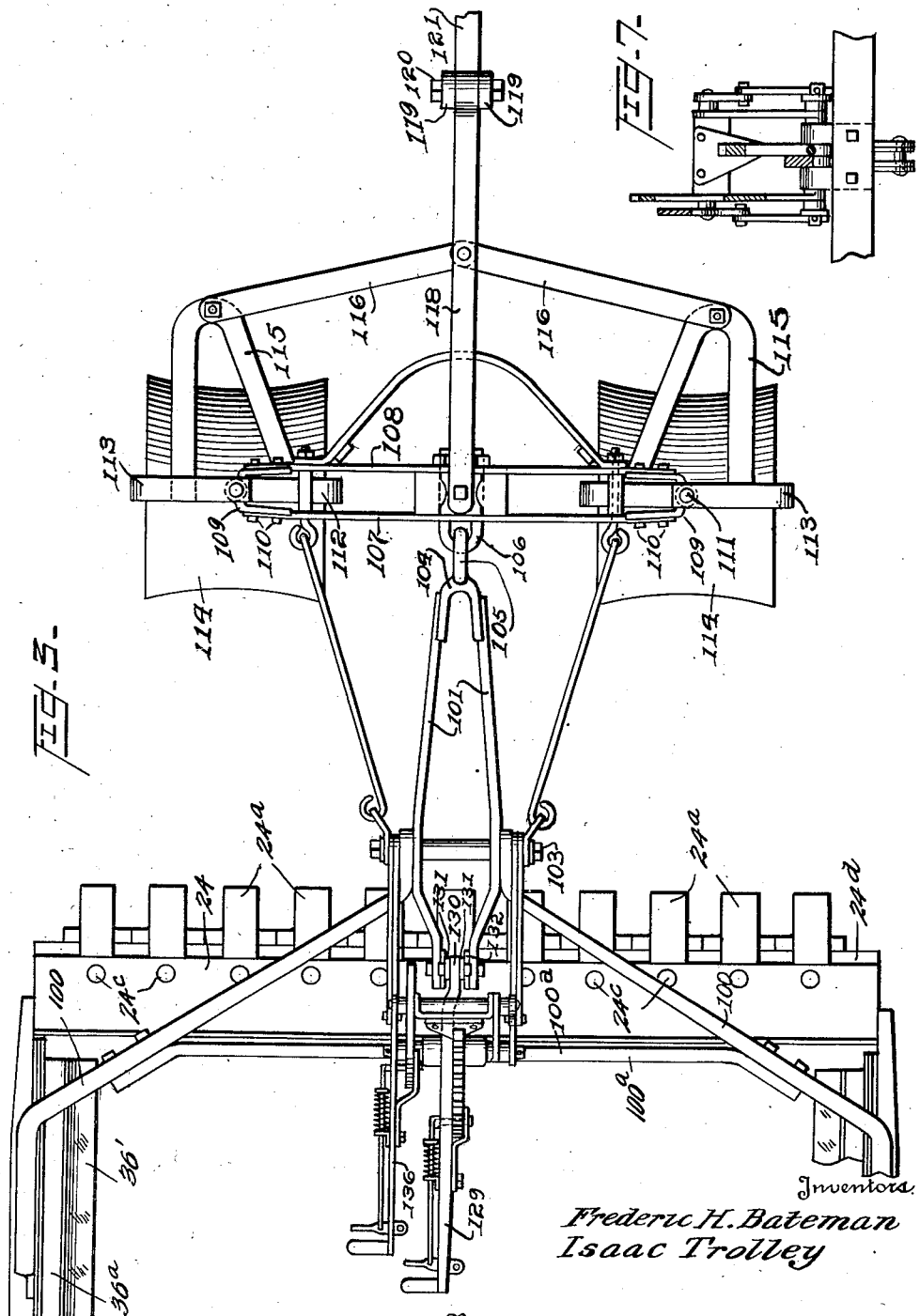

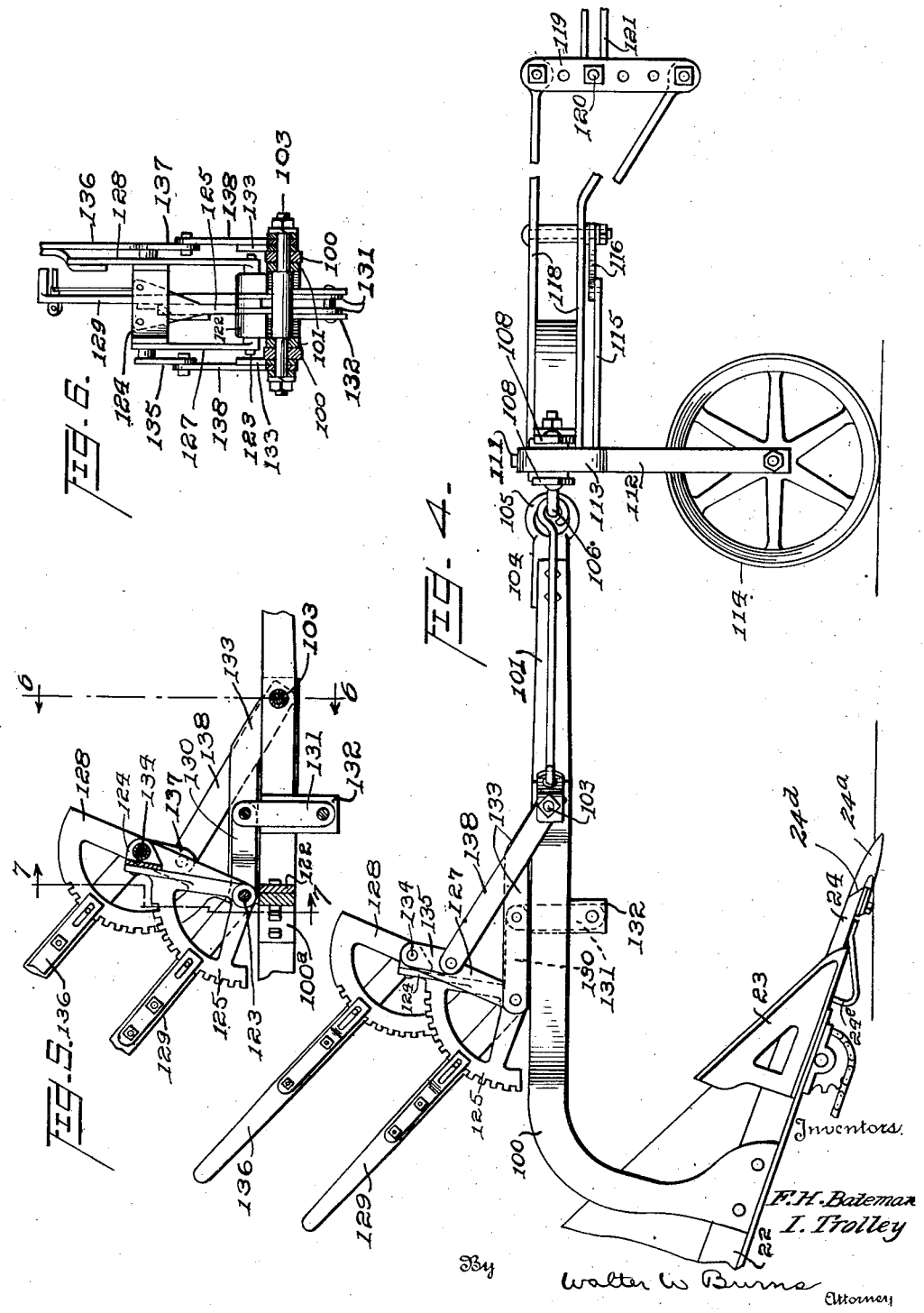

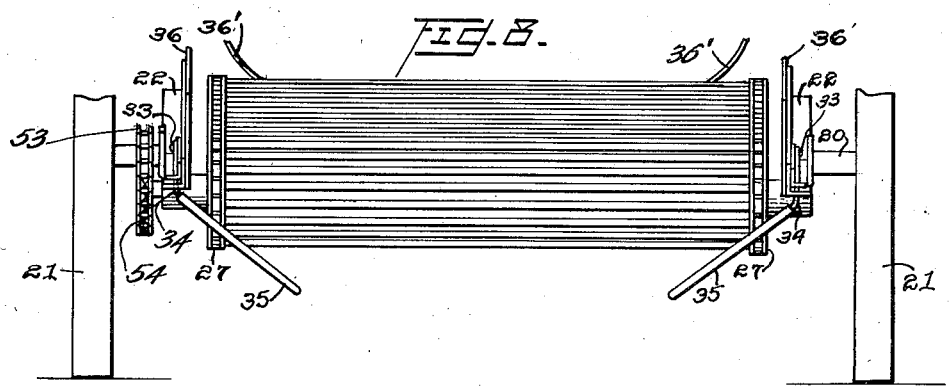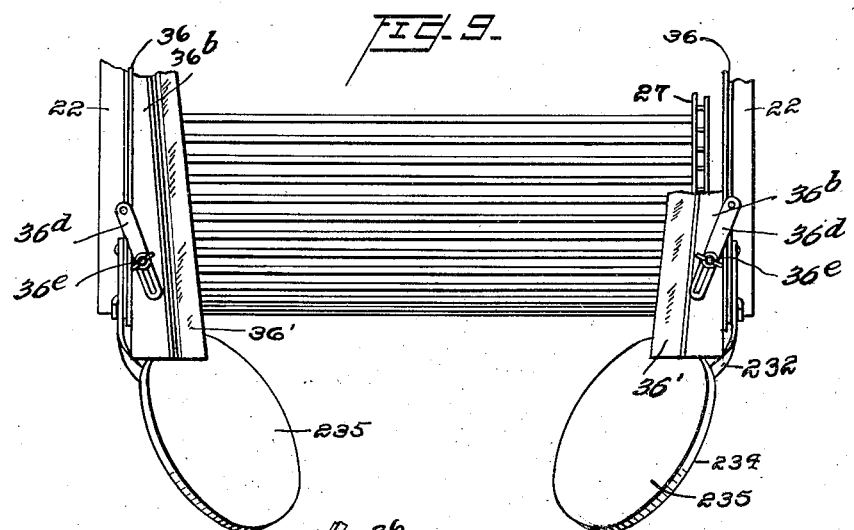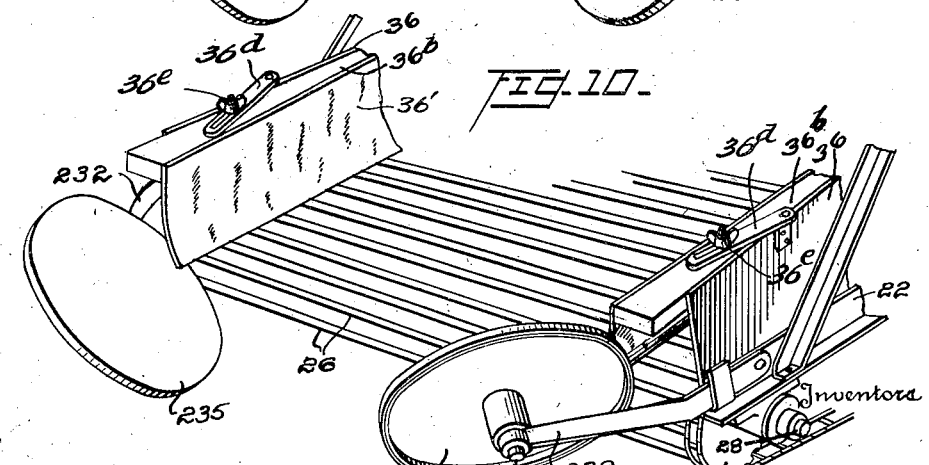

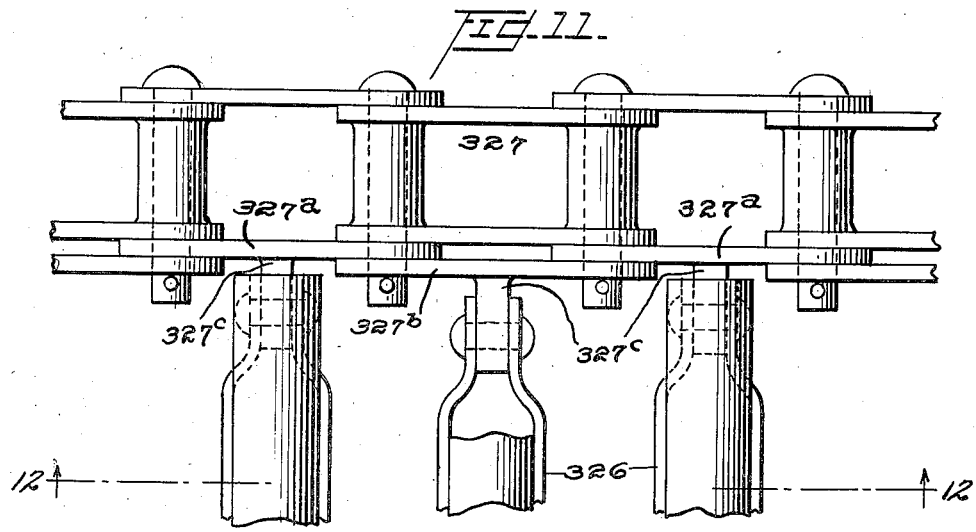
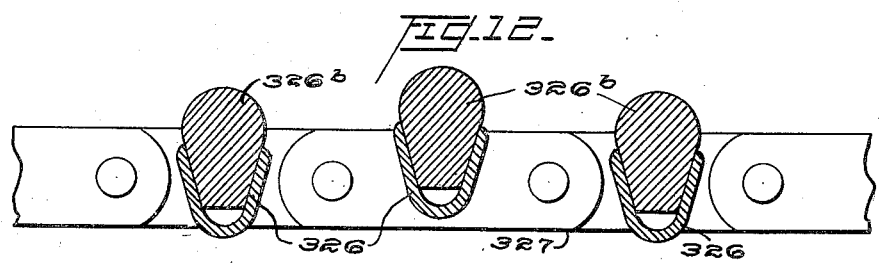
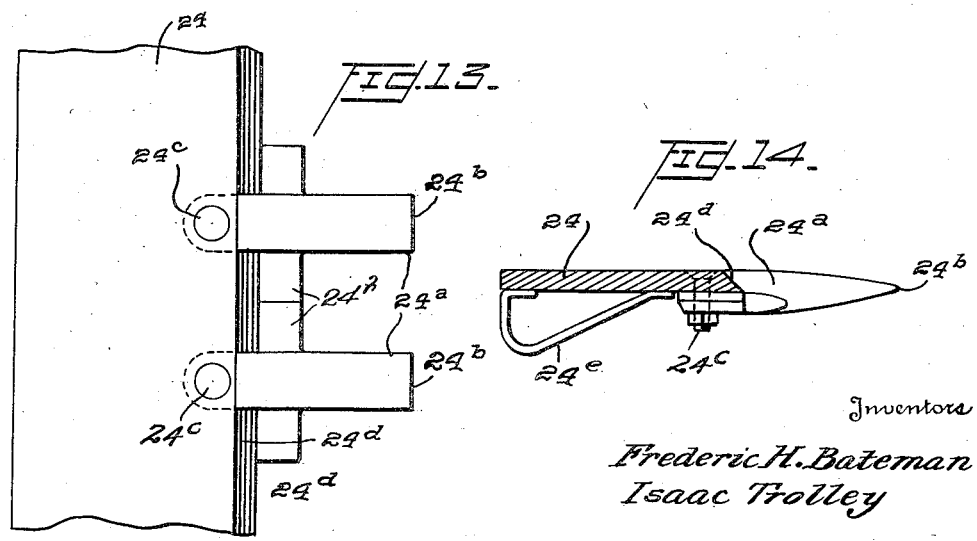
Inventors
Frederic H. Bateman
Isaac Trolley
By Walter W. Burns
Attorney

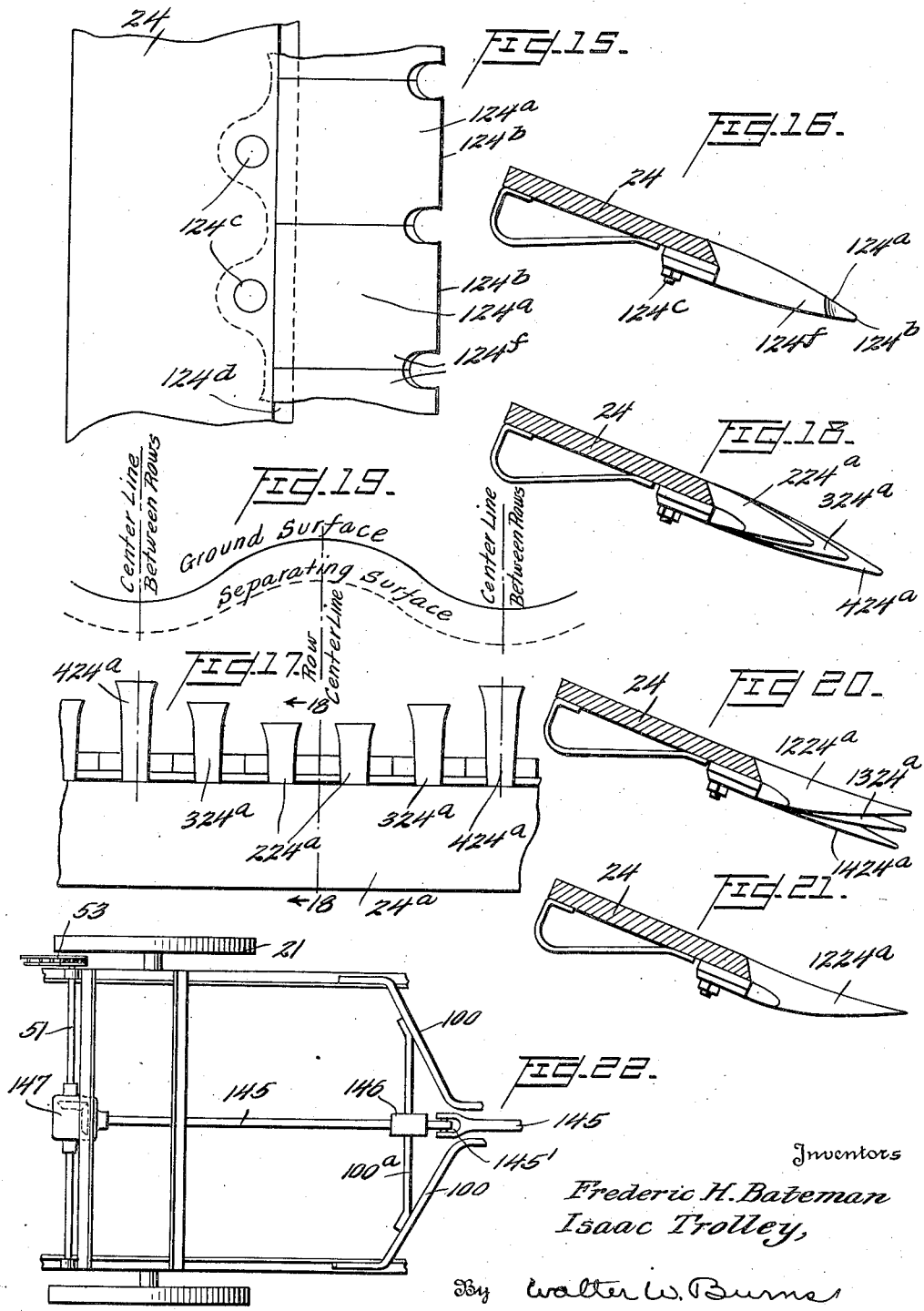

2,071,325

UNITED STATES PATENT OFFICE 2,071,325

VEGETABLE DIGGER

Frederic H. Bateman and Isaac Trolley, York, Pa., assignors to Fred H. Bateman Company, Camden, N. J., a corporation of New Jersey Application January 25, 1935, Serial No. 3,482

26 Claims. (Cl. 55—51)

This invention relates to diggers and has particular relation to those diggers which may dig one row or more than one row at a time.

Diggers for digging one or a plurality of rows of vegetables as potatoes during one passage over the ground have been made and while these have given more or less satisfaction, they have certain inherent disadvantages which make them objectional.

In the digging of vegetables from the ground by hand and by mechanical means, one of the greatest problems is the reduction of injury due to contact with the hand tools or digging and handling portions of the mechanical means when these are used.

While the ideal condition would be to absolutely prevent injury to the vegetables being dug, it has been found that in some instances as high as forty or more percent of the vegetable units are injured. This injury not only affects the appearance and places the product in a lower grade for sale but also shortens the period which it may be kept before becoming unfit for use.

The problem then is to carefully lift the vegetables from the ground, separate them from the earth and deposit them upon the ground or in containers without injury.

The primary object of this invention is the provision of an improved mechanical vegetable digger.

Another object of the invention is the provision of a digger which will dig one or a plurality of rows with a single digging element.

A further object of the invention is the provision of an improved digger which will dig and separate the vegetables from a plurality of rows with a single digging and by a single separating means.

A still further object of the invention is the provision of a digger which will lift the earth from a plurality of rows and provide space, on the earth separating means, between the row centers to facilitate separation of the earth from the vegetables.

Still another object of the invention is the provision of a digger wherein the possibility of contact between the vegetables and metal, during the digging and separating process, is reduced to a minimum.

Another and still further object of the invention is the provision of a digger having a carrier having transverse members with resilient surfaces to prevent contact of the vegetables with metallic portions.

Another and still further object of the invention is the provision of an improved digger having an endless conveying and separating means with the drive connections at the rear supporting element.

Another and still further object of the invention is the provision of an improved digger which will dig a plurality of rows and deposit the vegetables in a single relatively narrow row to facilitate picking them up from the ground.

Another and still further object of the invention is the provision of an improved plow member having separable spaced tooth members having earth-cutting edges, some of which may be forward of the cutting edges of adjacent corresponding members.

Another and still further object of the invention is the provision of a plow for a vegetable digger which will be of sufficient width to lift the vegetables, earth, plants and weeds of a plurality of single planted rows, for delivery to the separating mechanism.

Other and further objects of the invention will be apparent to those skilled in the art, from a reading of the complete specification and claims.

Referring to the drawings wherein we have illustrated an embodiment of our invention, Fig. 1 is a side elevation of the digger with the draft device removed, Figs. 1a, 1b, 1c, 1d, 1e, are detail views of various modifications of the elevator cross bars, Fig. 1f is a detail view of the main frame, Fig. 2 is a plan view of the structure shown in Fig. 1 with the resilient linings 36' partially broken away for purposes of illustration, Fig. 3 is a plan view of the forward portion of the digger, Fig. 4 is an elevational view of the structure shown in Fig. 3, Figs. 5, 6, and 7 are detail views of the depth-controlling mechanism, Fig. 8 is a rear detail view of the implement as shown in Figs. 1 and 2, Figs. 9 and 10 are respectively plan and rear-perspective views of a modified form of the discharging devices, Figs. 11 and 12 are fragmental views of a modified chain and elevator cross bar, Figs. 13 and 14 are detail views of the digger teeth, Figs. 15 and 16 are plan and sectional views respectively of a modified form of plow member and teeth, Figs. 17 and 18 show a modified form of plow, Fig. 18 being of a section on the line 18—18 of Fig. 17, Fig. 19 is a ground section illustrating the separating path of the plow of Figs. 17 and 18, Figs. 20 and 21 are further modifications of the plow construction, Fig. 22 is a fragmental view of the drive means for the conveyor when a power take-off is used, utilizing a drive connection directly from the tractor which is, in this instance, drawing the digger.

In the present illustration we have shown a digger having a capacity for digging two rows of potatoes. The advantages which would be present in a digger for digging a larger number of rows would be present in the two-row digger. Consequently it is believed the illustration of a larger digger is not necessary.

Throughout the specification and drawings, the same reference characters refer to the same or similar parts.

At 20, is illustrated the main axle which is supported by the ground wheels 21 and which supports the main frame member 22. These main frame members are in the form of angle irons having a portion forward of the axle sloping toward the ground engaging or plow member and also having a portion sloping rearwardly from the axle to bring the vegetables closer to the ground in preparation for discharge.

Secured at the lower forward end of the frame members 22 are angular members 23 which carry at their points, ends of the ground engaging or plow member 24. This plow member is provided with separable teeth 24a which are beveled on the bottom so as to form sharp cutting edges 24b and are secured in place by bolts 24c. A bevel surface 24d with the corresponding surfaces of the teeth, coact to provide a reinforcing means for the bolts 24c to hold the teeth in place and from front and rear movement.

The abutting wings 24f of the removable teeth 24a coact with each other and with the bevel surface 24d and its complementary surface to distribute the stress among several teeth and the plow member 24 when a shock is received by any one tooth.

On the under surface of the plow member 24 is a guard or fender 24e which extends from one end of the plow to the other. This guard or fender 24e is of a bent plate construction secured at its forward edge beneath the plow member 24 and just at the rear of the teeth 24a and at its rear to the rear edge of the plow. As the plow passes along beneath the ground surface, stones are encountered. In the past it has been found to be difficult to prevent the stones from interfering with the apron mechanism. With the guard or fender 24e, the stones which are dislodged by the plow are held in the soil by the lower substantially horizontal surface of the guard or fender 24e, thus preventing contact and interference with the elevating mechanism to be described.

In order to meet different conditions due to the difference in soil and the different manners of forming the rows, we provide for varying the shape and proportions of the teeth and also the arrangement on the plow member 24.

In Figs. 15 and 16 a modified form of tooth construction is shown wherein the teeth 124a with the forward sharp edge 124b, are secured in place, by the bolts 124c, on the surface 124d of the plow member 24. This type differs from the type of tooth already described in that the wings 124f are short and extend out closer to the forward edges of the teeth. It has been found that in some kinds of soil, this type of tooth is preferable.

The teeth 124a are preferably slightly wider at their points than at portions to the rear thereof. This construction tends to keep the stones from clogging the spaces between the forward portions of the adjacent teeth.

In Figs. 17, 18, 19, we show a modified form of plow and its operation. The teeth 224a, 324a and 424a are constructed somewhat similarly to the teeth 24a but are made of varying length. It will be noted that the longest teeth 424a in this embodiment travel in the lowest portions—that is, between the rows, while the shortest teeth 224a, are beneath the highest portion of the row which is at the center as illustrated in Fig. 19. In this way a minimum of earth is lifted onto the separator but all of the teeth travel beneath the ground and lift not only the vegetables, vines and soil of the row but the weeds between the rows as well.

The teeth 224a, 324a, 424a are slightly wider at their outer ends as described for the teeth 124a.

In Fig. 20, we have shown a plow having teeth of the same length but having their center lines at varying vertical angles with relation to the inclination of the plow member 24. The teeth 1424a correspond to the teeth 424a, the teeth 1324a and 1224a corresponding to the teeth 324a and 224a do not go into the ground to so great a depth as the teeth 1424a. It is to be noted that the teeth illustrated in Fig. 20 have a concave top. Teeth similar to the tooth 1224a may be used throughout the length of the plow member 24 as shown in Fig. 21.

It will be observed that in each of the modifications of the plow and its teeth, there is a space between the adjacent teeth which does not have any sharp acute angle at the throat. This construction with the cutting edges forward, tends to throw the roots to one side or the other, permitting the dirt separation to continue. However when the roots reach the recesses between the teeth, they are either cut or allowed to pass over or under and without retarding the earth-cutting operation or without being caught between the teeth.

Immediately to the rear of the plow 24 and mounted on the angle pieces 23 are idler sprockets or rollers 25. These rollers carry the forward end of the apron conveyor which carries the vegetables to the rear and separates the same from the soil. As the problem of injury to the vegetables, as potatoes, has been a serious one, we have provided a specially designed cross bar 26 for the elevator apron. This cross bar comprises in the present embodiment, a V-shaped metallic member 26a having in the open portion of the V, a member 26b having a resilient surface. This resilient portion is provided to protect the vegetables against injury. The material and the details of construction may vary according to the desire of the designer.

In the drawings, we have illustrated a cylindrical strip 26b which is of wood and is secured in place by countersunk rivets 26c. As an optional construction, we have also illustrated the V-shaped member 26 having a hollow reinforced rubber hose-like non-metallic resilient member 226b which is held in place by rivets 226c. In this construction, we may provide a wooden strip 226d through which the rivets 226c pass. In the assembling operation, a hole with a ragged edge is forced in the vegetable contacting portion of the hose through which the head of the rivet is passed. Or if desired, the hose-like member 226b may be put in, in sections and held by a flat rod 226e which is riveted by the rivets 226c at the ends of the hose-like sections.

It will be noted that the exposed edges of the V-shaped members which form the main body of the cross bars 26, are preferably rounded. This is done to remove the possibility of the vegetables touching the metal of the V-shaped member and to permit the passage of stones between the bars.

The conveyor bars 26 in some soil become covered with dirt and this covering of itself forms a cushion which protects the vegetables from injury.

The cross bars 26 are secured to chains 27, which chains roll on the idler rollers 25 to form the forward end of the elevator. It will be noted that the idler 25 is slightly above the bottom of the guard 24e for the purpose of clearing the stones which are pressed into the ground at this level.

As an alternative structure for the elevator cross bars and chain we have provided a structure as illustrated in Figs. 11 and 12 wherein each alternate crossbar is higher (or lower) than the adjacent bars. The chain 327 has attaching links 327a and 327b by which the bars 326 are attached to the chain 327. The links 327a, 327b are similarly constructed with lugs 327c. These lugs 327c are off center with the axes of the links. Each alternate bar 326 is attached to its lugs 327c with the latter reversed in position. This provides the alternate high-and-low construction illustrated in Fig. 12. The insert resilient members 326b are of slightly different shape from their counterparts 26b.

The elevator is supported at the rearward end by a pair of sprockets supported on the shaft 28, which also carries a sprocket at one end to serve as the driving means for the elevator. At various points throughout the length of the upper run of the conveyor, rollers of circular vertical section or agitator sprockets are placed, to support the elevator intermediate the ends and when the agitator sprockets are used, to agitate the carrier of the elevator to shake free the soil from the vegetables in order that it may drop to the ground between the cross bars 26.

The lower run of the conveyor is supported by the idler rollers 29 and 30 which are supported by suitable brackets 29' and 30' from the main frame.

Pivoted at the rear of the main frame members 22 at 30a are swinging members 31 which are in the form of angle irons. Secured to the vertical portion 32 of the angle iron pieces 31 by bolts or rivets 33, and passing through the horizontal portions, are guiding or directing prongs 34 to direct the potatoes or other vegetables toward the center to bring them into a single narrow row to assist in the operation of gathering them. These prongs 34 are preferably covered with a soft covering 35 such as of rubber hose to prevent the potatoes or other vegetables from coming into contact with the metal of the prongs. This resilient contact between the vegetables and the directing prongs, prevents injury to the vegetables. At each side of the elevator is a side board 36 to which we have secured a rail 36a at a height above which the soil will reach during the separation. This rail extends out from the board 36 toward the center of the conveyor. At its rear is a pivoted section 36b which is pivoted at 36c to the board 36. An adjusting link 36d is pivoted to the board 36 and has an inner slotted end which surrounds a screw 36e which carries a wing nut to be used for securing the pivoted section in any one of a plurality of adjusted positions. To the edge of the rail 36a and the pivoted section 36b is secured a protecting means such as rubberized canvas strip or other soft material 36' in a position to cover such portions of the chain 27 as might otherwise be contacted by the vegetables.

We have illustrated another form of construction for bringing the vegetables into a relatively narrow row, other than the prongs 34, already described. This form has some advantages over the prong construction.

In this modified form, we provide extensions 232 from the main frame members 22. These extensions at their ends carry pintles 233 which carry revolving guide disks 234 which are provided with such bearings that the vegetables, as they engage the surface of the disks, will cause the disks to revolve and gently deposit the vegetables on the ground. The surfaces of these disks may be covered with rubber or other soft materials 235 to eliminate contact of the vegetables with metal and the consequent injury to the vegetables.

It will thus be seen that as the plow 24 passes beneath the vegetables and raises the soil and vegetables onto the elevator and as the latter separates the soil and carries the vegetables to the rear and delivers them back to the ground, at no time may the metal of the machine come into contact with the vegetables.

While on the elevator, contact is made only with the wood, rubber or other soft or resilient portions 26b, 226b, 326b of the cross bars while if the vegetable works to the side, as it may do on the rear and the apron, it contacts with the lining of rubberized canvas 36' of the side board 36. Upon reaching the rear end of the elevator, the potatoes or other vegetables being delivered between the prongs 34 or disks 234 come into contact only with their soft covering 35 or 235. In this manner one of the greatest problems of all potato diggers has been solved.

The frame members 22 are connected to and supported by saddles 40 which are clamped to the axle 20 by means of U-shaped saddle bolts 41.

As a stiffening means there is provided an X-frame construction which is connected to the axle 20 by the U-bolts 42. Plates 43 are held in place on opposite sides of the axle. These in turn are bolted to a pair of V-frames 44 which extend to and are bolted to the side frame members 22. With the side frame members 22 secured directly to the axles 20 and connected to the V-frames 44 which in turn are connected to the axle adjacent its center, it will be clear that the main frame is of a rigid and substantial construction.

In order to provide power means for driving the endless conveyor elevating separator device, we provide a motor 45 having a shaft 46 which carries a drive sprocket 47. The sprocket 47 drives a chain 48 which in turn drives a large sprocket 49. This sprocket 49 is connected by a clutch 50 to a shaft 51. A handle 50a controls the operation of the clutch 50. On the shaft 51 at the end opposite to the clutch 50 is a small sprocket 52 which drives a chain 53 which in turn drives a larger sprocket 54 on the shaft 28. The shaft 28 carries the sprockets 59 which carry the endless elevator-separator.

In constructing the device for use with a tractor, the motor 45 and its connections to the shaft 51 are dispensed with. In place, we provide a power shaft 145 having a universal joint 145' which has a supporting bearing 146 supported on the frame member 100a. The shaft 145 is connected through gears in the gear housing 147 to drive the shaft 51, the gear 52 and the chain 53 as already described.

We will now describe the forward end of the digger device including the means for controlling the depth to which the plow 24, will enter into the ground.

Connected to the forward ends of the frame members 22 are two forward frame members 100 which extend forwardly and inwardly to and in contact with a pair of forward truck members 101. These forward truck members are mounted pivotally on the bolt pivot members 103 as are the frame members 100. The forward ends of the frame members 101 are attached to a forging 104 having at its forward end an eye 105. The eye 105 is connected to a U-bolt 106 which is secured to a transverse plate 107. The plate 107 with its counterpart 108 are secured at their ends to wheel pintle bearing members 109 by the bolts 110. In these pintle bearings 109 are pintles 111 upon the lower ends of which are the wheel yokes 112. The brace yokes 113 are secured to the yokes 112 at their upper ends. Wheels 114 are suitably journaled in the yokes 112 to support the forward end of the digger and to keep constant the depth of the plow 24 below the surface of the ground during operation.

Steering arms 115 are secured to the yokes 112 and are connected at their outer ends to the steering links 116. These steering links are pivoted together by the bolt of the steering tongue 118. The upper and lower members of the tongue 118 are connected at their forward ends by a pair of vertical straps 119 having various openings for adjustable connection to the bolt 120 which carries the draft member 121.

As already stated, the forward frame members 100 are pivotally connected to the frame members 101 by the bolt 103. This bolt 103 furnishes the means by which the two sets of frame members are pivoted to relatively adjusted positions, the adjustments being maintained by control of the rear ends of the frame members 101 as will be described.

Secured to the cross brace 100a is a casting 122. Pivoted to the casting 122, on the bolt 123, is a yoke 124, to which yoke is welded a quadrant 125. A crank shaft 134 is pivoted in the yoke 124. The upper end of the link 127 and the quadrant link 128 are both pivoted about the crank shaft 134 and are pivoted at their lower ends to the bolt 123. A hand lever 129 is pivoted about 123 as a center and cooperates with the quadrant 125, the latter holding the lever in any desired adjusted position by means of the usual dog construction.

The lever 129 is provided with a bell crank 130 which connects pivotally to links 131 which are pivotally connected to the plates 132 which extend downwardly from and are welded to the frame members 101. The purpose of the plates 132 in the illustrated embodiment, is to permit the links 131 to be longer and permit a freer movement for adjustment. Stiffening links 133 are provided and are connected at their ends to the bearing bolts 123 and 103.

Passing through the two ends of the yoke 124 and also through the link 127 and the quadrant link 128, there is crank shaft 134 before-mentioned. On one end of the crank shaft 134 is a crank arm 135 and on the other end is a hand lever 136 and another crank arm 137. At the outer ends of the crank arms 135 and 137 are links 138 which are connected at their forward ends to the bearing bolt 103. The quadrant of the quadrant link 128 has its center at the axis of the crank shaft 134, the hand lever 136 being provided with the usual dog construction in position to engage the teeth of the quadrant.

The operation of the plow height adjusting means depends, as already stated, upon the relative adjustment of the frame members 101 which are attached to the forward ground wheels, and the frame members 100 which are connected to the elevator and plow devices. In order to effect the great adjustment necessary, by hand lever means, the two hand levers 129 and 136 have been provided. As the hand lever 129 is adjusted to different adjustments relative to the quadrant, its crank arm 130 raises and lowers the rear ends of the frame members 101 relative to the frame members 100. This operation does not affect the position of the yoke 124 or the link 127 or the quadrant link 128 relative to the frame members 100 or to each other.

A further adjustment in either direction is possible through the hand lever 136 and its connections. When such further movement is desired, the dog of the hand lever 136 is released from the quadrant. Upon movement of the hand lever, the crank shaft 134 turns the cranks 135, 137. As the links 138 are pivoted at their forward ends to the bearing bolt 103, no movement can be had here. The result is that the crank arms 135, 137 swing about the rear ends of the links 138. This causes a swinging about the center of the bearing bolt 123, of the yoke 124, the link 127, the quadrant link 128, the quadrant 125, the lever 129, the crank arm 130—all as one unit—which causes the adjustment of the rear ends of the frame members 101 relative to the frame members 100. This latter adjustment means gives a greater leverage due to the position of the crank arms 135, 137—than the leverage possible with the lever 129.

In operation, the plow 24 is lowered into the ground as the machine progresses forward, the lowering operation being controlled by the operation of the hand levers 129 and 136 as already described. When the plow 24 reaches the required depth—below the vegetables in the ground, it passes beneath the vegetables and lifts the soil with the vegetables onto the elevator with the cross bars 26. The movement of the agitators if they are used, and the travel movement of the elevator, break up the soil, the particles of which fall between the cross bars to the ground. This leaves the vegetables, as potatoes, on the elevator to be carried the length of the elevator-carrier to a position where they are dropped to the ground. Those at the outer edges engage the soft covering 35 of the prongs 34 or the soft covering 235 of the disks 234—depending upon which form is used. The clutch 50 is used to start and stop the elevator at the ends of the rows being dug.

While we have shown and illustrated an embodiment of our invention in detail, we desire to have it understood that the disclosure is merely illustrative and that modifications and changes may be made without departing from the spirit of the invention and within the scope of the appended claims.

Having described our invention, what we claim is:—

1. A digger for removing vegetables from the ground comprising plow means for digging a plurality of rows simultaneously, and a separating means for supporting and separating the vegetables from the soil and of a width as great as the combined width of the rows and the space between the rows, said separating means having yielding non-metallic surfaces on all vegetable-contacting portions.

2. A digger for removing vegetables from the ground comprising plow means for digging a plurality of rows simultaneously, and a separating means for supporting and separating the vegetables from the soil and including transverse members of a length as great as the combined widths of the rows and the space therebetween, said separating means having yielding non-metallic surfaces on all vegetable contacting portions.

3. A digger for removing vegetables from the ground comprising plow means for digging a plurality of rows simultaneously, and means for depositing the vegetables in a single row narrower than the width of the separating means, and means for adjustably controlling the width of the deposit row.

4. A digger for removing vegetables from the ground comprising plow means for digging a plurality of rows simultaneously, a separating means for supporting and separating the vegetables from the soil and of a width as great as the combined width of the rows and spaces between the rows and adjustable guide means for causing the deposit of the vegetables in a single relatively narrow row of predetermined width at the rear of the digger, and means for securing the guide means in any one of a plurality of adjusted positions.

5. A digger for removing vegetables from the ground comprising plow means, a separating device rearward of the plow means and comprising spaced members extending across the digger for separating the soil from the vegetables, all of the spaced members having resilient vegetable-contacting surfaces to prevent injury to the vegetables, and protecting means at the sides of the separating means and having yielding non-metallic vegetable-contacting surfaces.

6. A digger for removing vegetables from the ground comprising plow means, a separating device rearward of the plow means and comprising spaced members to permit passage of the soil and resilient contact means on all of the exposed surfaces of the members to prevent injury to the vegetables, and protecting means at the sides of the separating means and having yielding non-metallic vegetable-contacting surfaces.

7. A digger for removing vegetables from the ground comprising plow means, an endless conveyor separating device rearward of the plow means and comprising spaced transverse members of a distance apart to permit passage of the soil, the transverse members each having vegetable-contacting surfaces of a yielding non-metallic character to prevent injury to the vegetables.

8. A digger for removing vegetables from the ground comprising plow means, an endless conveyor separating device having transverse members of V-shape cross section, the transverse members having non-metallic members secured in their open sides.

9. A digger for removing vegetables from the ground comprising plow means, an endless conveyor separating device having transverse members, guide boards at the sides of the separating device and yielding non-metallic vegetable contacting surfaces for the exposed portions of the separating device and guide boards.

10. A digger for removing vegetables from the ground comprising plow means, a separating device rearward of the plow means and including metallic spaced members to permit passage of the soil and wooden strips in position thereon to contact the vegetables carried by the separating device.

11. A digger for removing vegetables from the ground comprising plow means, a separating device rearward of the plow means, and including spaced members to permit passage of the soil, the spaced members having tubular rubber means in position to contact the vegetables carried by the separating device, and means protected from vegetable contact for holding the rubber means in place.

12. A digger for removing vegetables from the ground comprising plow means, a separating device rearward of the plow means, the separating device having transverse members with built-in yielding non-metallic bearing surface members, means for guiding the vegetables into a row narrower than the width of the separating device and resilient means on the guiding means to protect the vegetables from injury.

13. A digger for removing vegetables from the ground comprising plow means having an inclined earth-entering portion, a stone fender beneath the plow and having a substantially horizontal rearwardly extending plane surface portion, and an endless conveyor separator slightly to the rear and above the level of the stone fender.

14. A digger for removing vegetables from the ground comprising plow means having an inclined earth-entering portion, a stone fender beneath the plow, having a substantially horizontal rearwardly extending plane surface portion above the lower edge of the earth-entering portion, and an endless conveyor separator slightly to the rear and above the level of the stone fender.

15. A digging means for a vegetable digger comprising a transversely extending plow member of a width to simultaneously dig a plurality of single rows of planted vegetables and earth-cutting teeth extending forwardly from the plow member.

16. A digging means for a vegetable digger comprising a transversely extending plow member of a width to simultaneously dig a plurality of single rows of planted vegetables and removable earth-cutting teeth extending forwardly from the plow member.

17. A digging means for a vegetable digger comprising a transversely extending plow member and independently removable sharp-edged teeth extending forwardly from the plow member, the teeth being wider at the forward edge than parts rearward thereof.

18. A digging means for a vegetable digger comprising a transversely extending plow member and independently removable sharp-edged teeth extending forwardly from the plow member and having portions engaging adjacent teeth, the teeth being wider at the forward edge than parts rearward thereof.

19. A digging means for a vegetable digger comprising a transversely extending plow-member and teeth extending from the plow-member, the teeth being so shaped as to engage the earth below its surface at different levels.

20. A digging means for a vegetable digger comprising a transversely extending plow member and teeth extending forwardly from the plow member, some of the teeth pointing downwardly at a greater angle than other teeth.

21. A digging means for a vegetable digger comprising a transversely extending plow member and independently removable teeth extending forwardly from the plow member, the teeth being of variable length, and tapering rearwardly from their front edge.

22. A digging means for a vegetable digger comprising a transversely extending plow member and independently removable teeth extending forwardly from the plow member, some of the teeth having forwardly and upwardly curved ends relative to other adjacent teeth.

23. A digging means for a vegetable digger comprising a transversely extending plow member and teeth extending forwardly from the plow member, the forward ends of the teeth being placed to engage the ground at different levels, the lower forward ends being below the lower portions of the ground engaged and the higher forward ends being below the surface of the higher portions of the ground engaged.

24. A digging means for a vegetable digger comprising a transversely extending plow member of a width to simultaneously dig a plurality of single rows of planted vegetables and teeth extending forwardly from the plow member, the forward ends of the teeth being placed to engage the ground at different levels, the lower forward ends being below the lower portions of the ground engaged and the higher forward ends being below the surface of the higher portions of the ground engaged.

25. A digger for removing vegetables from the ground, comprising plow means adjustable to enter the ground below the vegetables, means for separating the soil from the vegetables and having all of its outer vegetable-contacting portions of a yielding non-metallic material, side protecting means at the sides of the separating means, having yielding non-metallic vegetable-contacting surfaces throughout the portion of the sides where the vegetables contact during the separation.

26. A digger for removing vegetables from the ground comprising plow means adjustable to enter the ground below the vegetables, means for moving the soil and vegetables rearwardly and at the same time to separate the vegetables, guide means at the sides and rear of the separator, all of the vegetable-contacting surfaces of the separator and guide means being of a yielding non-metallic material to give complete protection to the vegetables during separation and delivery to the ground.

FREDERIC H. BATEMAN.
ISAAC TROLLEY.